United States Patent [19]

Otani

[11] 4,456,893
[45] Jun. 26, 1984

[54] EQUALIZER HAVING A SUBSTANTIALLY CONSTANT GAIN AT A PRESELECTED FREQUENCY

[75] Inventor: Susumu Otani, Tokyo, Japan

[73] Assignee: Nippon Electric Co., Ltd., Tokyo, Japan

[21] Appl. No.: 408,301

[22] Filed: Aug. 16, 1982

[30] Foreign Application Priority Data

Aug. 21, 1981 [JP]  Japan .................................. 56-130239

[51] Int. Cl.³ ............................................. H04B 3/14
[52] U.S. Cl. .................... 333/18; 333/28 R; 375/12; 364/724
[58] Field of Search ................. 333/18, 166; 375/11, 375/12, 13, 14; 364/724, 824, 825; 455/50, 63, 18

[56] References Cited

U.S. PATENT DOCUMENTS

| | | | |
|---|---|---|---|
| 3,715,665 | 2/1973 | Chany ........................... | 333/18 R X |
| 3,723,911 | 3/1973 | Forney, Jr. ...................... | 375/13 X |
| 3,757,221 | 9/1973 | Moehrmann ...................... | 375/14 |
| 4,004,226 | 1/1977 | Qureshi et al. .................... | 375/13 |
| 4,035,735 | 7/1977 | Akashi et al. ..................... | 375/12 X |
| 4,071,827 | 1/1978 | Koike et al. ...................... | 333/18 X |
| 4,184,129 | 1/1980 | Macchi nee Donjon et al. ... | 333/18 |
| 4,290,139 | 9/1981 | Walsh .............................. | 333/18 X |

Primary Examiner—Paul L. Gensler
Assistant Examiner—Benny Lee
Attorney, Agent, or Firm—Sughrue, Mion, Zinn, Macpeak & Seas

[57] ABSTRACT

An equalizer of a transversal filter type is given a substantially constant gain at a preselected frequency ($f_p$) in a predetermined frequency band of an input and an output signal. For this purpose, the output signal is given by multiplying the routine transversal filter output by a reciprocal of an absolute value of a sum of complex tap gains ($C_1$ to $C_{N+1}$). Alternatively, the input signal and successively delayed signals (IN and $D_1$ to $D_N$) may be multiplied by the reciprocal before summation. It is possible to approximate the reciprocal by omitting those of the tap gains which are near both ends (as $C_1$ and $C_{N+1}$).

5 Claims, 6 Drawing Figures

EQUALIZER HAVING A SUBSTANTIALLY CONSTANT GAIN AT A PRESELECTED FREQUENCY

BACKGROUND OF THE INVENTION

This invention relates to an equalizer which is useful particularly in a satellite communication system.

In a conventional satellite communication system, a transmission line or path is established through a satellite between earth stations located at different terrestrial sites. With the satellite communication system, one of the earth stations is operable as a transmitting side or end for sending an output signal to the satellite through the transmission path while the output signal is delivered through the transmission path to the earth station serving as a receiving side or end.

On board the satellite is an amplifier which is usually operable in a saturation state in order to raise the efficiency of electric power on board the satellite. Stated otherwise, such an amplifier is put into operation in a nonlinear state. In addition, distortion and noise are inescapably imposed on the output signal for some reason during transmission. As a result, the transmission line or path inevitably has a nonlinear characteristic due to nonlinear operation of the amplifier and the distortion and the noise.

Under the circumstances, equalization of the transmission path is indispensable with the conventional satellite communication system in order to equalize or remove the nonlinear characteristic of the transmission path and to reduce a bit error rate on the transmission path in question. Herein, it should be noted that the bit error rate is dependent on the distortion of the transmission path and on a signal to noise ratio of the output signal transmitted from the transmitting side.

Satisfactory or optimum equalization can not be accomplished when the transmission path is equalized only between the satellite and the receiving side by the use of an equalizer set up in the receiving side, as known in the art. In other words, the transmission path should also be equalized between the transmitting side and the satellite for the purpose of achieving the optimum equalization. This is because the transmitting side uses an amplifier operated in a substantial nonlinear state and, in addition, the distortion and the noise are also imposed on the output signal on the transmission line extending from the transmission side to the satellite.

In order to realize the optimum equalization, a conventional transmitting side is also equipped with an equalizer of a transversal filter type comprising a plurality of delay elements having a plurality of taps and a control signal generator for generating a plurality of gain control signals which define tap gains at the respective taps, as will later be described with reference to one of several figures of the accompanying drawing. Equalization is carried out by changing or controlling the tap gains of the equalizer in the transmitting side.

It is mentioned that a gain or electric power of the transmitting side is varied with the change of the tap gains. As a result, the signal to noise ratio is not kept constant on the receiving side because of the variation of the gain of the transmitting side. This means that the bit error rate fluctuates during equalization when the tap gains of the equalizer is controlled on the transmitting side. Accordingly, the optimum equalization can not be expected with the conventional satellite communication system even when the transmitting side is equipped with such an equalizer.

Alternatively, it is known in the art to connect an automatic gain control circuit to the equalizer so as to avoid such variation of the gain of the transmitting side. Use of the automatic gain control circuit results in transient production of the output signal having an excessive amplitude like a surge in an initial state, because gain control operation does not begin in the initial state. The production of the excessive amplitude brings about an obstruction to the other transmission lines.

SUMMARY OF THE INVENTION

It is an object of this invention to provide an equalizer used on a transmitting side of a satellite communication system, wherein a gain of the transmitting side is kept substantially constant without an automatic gain control circuit.

It is another object of this invention to provide an equalizer of the type described, wherein equalization can stably be carried out without causing any obstructions to any other transmission path.

An equalizer to which this invention is applicable is responsive to an input signal having a predetermined frequency band for supplying an output signal to a transmission line with the output signal adjusted to the transmission line. The equalizer comprises delay means for successively delaying the input signal to produce first through N-th delayed signals, control signal generating means for generating first through (N+1)-th gain control signals which define first through (N+1)-th complex tap gains, respectively, and output signal producing means responsive to the input signal, the first through the N-th delayed signals, and the first through the (N+1)-th gain control signals for producing the output signal. According to this invention, the output signal producing means comprises reciprocal signal producing means responsive to preselected ones of the first through the (N+1)-th gain control signals and a frequency specifying signal specifying a preselected frequency in the predetermined frequency band for producing a reciprocal signal representative of a reciprocal of an absolute value of a sum of the complex tap gains, of which the preselected gain control signals are representative at the preselected frequency, and combining means for combining the input signal and the first through the N-th delayed signals with the reciprocal signal and with the first through the (N+1)-th gain control signals, respectively, to produce the output signal.

DESCRIPTION OF THE PREFERRED EMBODIMENTS

Figure 1:
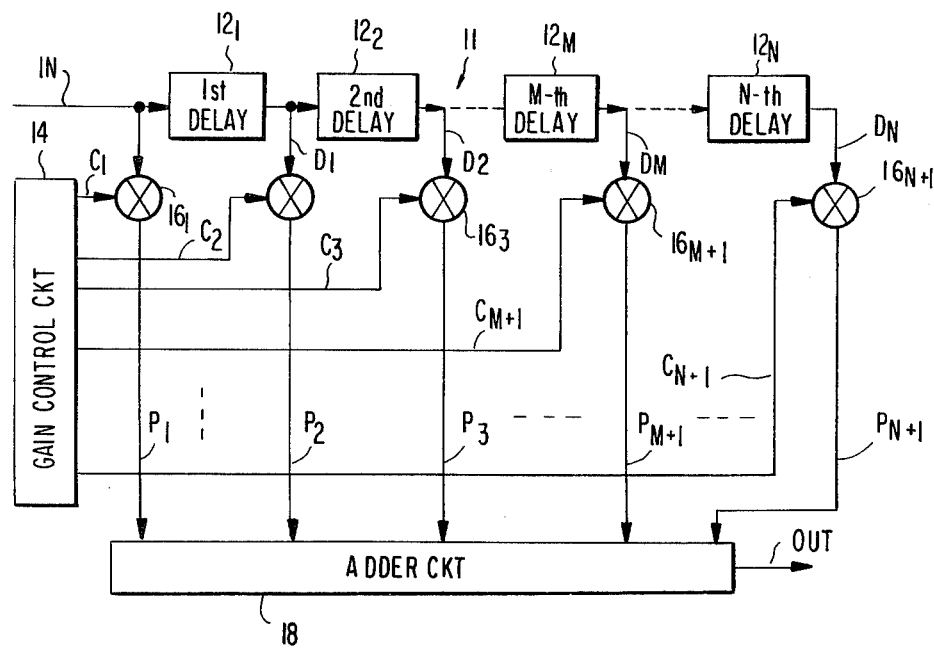
FIG. 1 is a block diagram of a conventional equalizer used in a satellite communication system.

Referring to FIG. 1, a conventional equalizer of a transversal filter type will be described for a better understanding of this invention. Let the equalizer be used at a transmitting end or side in a satellite communication system and be responsive to an input signal IN having a predetermined frequency band, for example, between 80 MHz and 200 MHz. The input signal IN is subjected to quadrature modulation and is given in the form of a complex signal including a real part or component and an imaginary part or component. The equalizer is operable to supply an output signal OUT to a transmission line or path (not shown) including a satellite between the transmitting side and a receiving end or side. The satellite is equipped with an amplifier, such as a travelling wave tube amplifier, operated in a nonlinear state. Distortion and noise are inevitably imposed on the output signal OUT during transmission between the transmitting side and the satellite and between the satellite and the receiving side. As a result, the transmission line inevitably has a nonlinear characteristic. With the equalizer, the output signal OUT is adjusted in consideration of the nonlinear characteristic of the transmission line, as will later be described in detail.

The equalizer comprises a delay circuit 11 for successively delaying the input signal IN to produce first through N-th delayed signals $D_1$ to $D_N$, where N represents an integer, for example four. Each of the first through the N-th delayed signals $D_1$ to $D_N$ is given in the form of a complex signal including a real and an imaginary component, as is the case with the input signal IN. Specifically, the delay circuit 11 comprises first through N-th delay elements $12_1, 12_2, \ldots,$ and $12_N$ connected in cascade and assumed to be equal in number to an even number represented by 2M, where M is representative of an integer. The integer N is, therefore, equal to 2M in this delay circuit 11. As well known in the art, the first through the N-th delayed signals appear through output terminals or taps of the respective delay elements $12_1$ to $12_N$. In addition, the input signal IN is produced as it stands without any delay. The delay circuit 11 has first through (N+1)-th taps and produces, through the first through the (N+1)-th taps, the input signal IN and the first through the N-th delayed signals $D_1$ to $D_N$, respectively. The total number of taps is equal to an odd number of (2M+1), in this delay circuit 11. Herein, the tap of the M-th delay element $12_M$ may be called a center tap for convenience of description. Let each of the delay elements $12_1$ to $12_N$ have a common delay $T_0$, such as several nanoseconds, in the illustrated delay circuit 11.

The equalizer further comprises a gain control circuit 14 for generating first through (N+1)-th gain control signals $C_1$ to $C_{N+1}$ which define first through (N+1)-th complex tap gains, respectively. The first through the (N+1)-th gain control signals $C_1$ to $C_{N+1}$ are multiplied by the input signal IN and the first through the N-th delayed signals $D_1$ to $D_N$ in first through (N+1)-th multipliers $16_1$ to $16_{N+1}$ to produce first through (N+1)-th product signals $P_1$ to $P_{N+1}$, respectively. A group of the first through the (N+1)-th multipliers $16_1$ to $16_{N+1}$ may be called a first multiplying circuit.

An adder circuit 18 adds the first through (N+1)-th product signals $P_1$ to $P_{N+1}$ to produce a sum signal representative of a sum of the first through the (N+1)-th product signals. The sum signal is produced as the output signal OUT from the adder circuit 18. Thus, a combination of the first multiplying circuit and the adder circuit 18 is operable to produce the output signal OUT in response to the input signal IN, the delayed signals $D_1$ to $D_N$, and the gain control signals $C_1$ to $C_{N+1}$.

As well known in the art, a relationship between the input signal IN and the output signal OUT is specified by the following transfer function $T(2\pi f)$:

$$T(2\pi f) = \sum_{x=1}^{N+1} C_x e^{-ix(2\pi f)T_0}, \quad (1)$$

where i represents the imaginary unit and f, a frequency of the input signal IN. When the delay at the center tap is assumed to be equal to zero and the integer M is used, Equation (1) is rewritten with respect to the center tap into:

$$T(2\pi f) = \sum_{y=-M}^{M} C_y e^{-iy(2\pi f)T_0}. \quad (2)$$

The transfer function $T(2\pi f)$ specified by Equation (1) or (2) defines a frequency characteristic of the equalizer illustrated in FIG. 1. From Equation (1) or (2), it is readily understood that the frequency characteristic can be varied in the equalizer by controlling the gain control signals $C_1$ through $C_{N+1}$. Such variation of the frequency characteristic serves to equalize the nonlinear characteristic of the transmission line. In addition, an absolute value of the transfer function $T(2\pi f)$ is representative of a gain between the input signal IN and the output signal OUT.

As mentioned before, it is difficult to completely know the nonlinear characteristic of the transmission line including the satellite. Therefore, the transmission line is equalized by controlling the gain control signals $C_1$ through $C_{N+1}$ on the transmitting side so that an optimum reproduction is carried out at the receiving end.

However, the gain of the equalizer is inevitably varied with the change of the gain control signals $C_1$ to $C_{N+1}$. As a result, the signal to noise ratio is changed on the transmission line with variation of the gain of the equalizer and optimum equalization is never accomplished with the equalizer, as described in the preamble of the instant specification.

Figure 2:
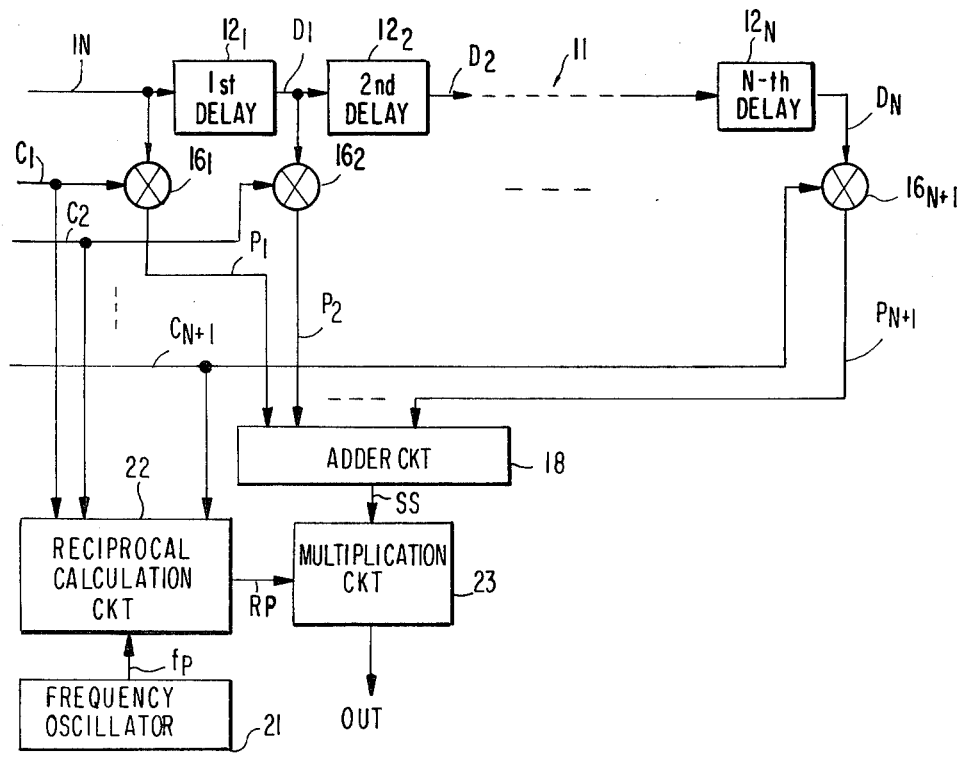
FIG. 2 is a block diagram of an equalizer according to a first embodiment of this invention, with a part omitted therefrom.

Referring to FIG. 2, an equalizer according to a first embodiment of this invention comprises similar parts designated by like reference numerals, with the M-th delay element 12M and the gain control circuit 14 removed from FIG. 2 merely for simplification of illustration. The illustrated equalizer further comprises a constant frequency oscillator 21 for generating a predetermined frequency signal specifying a preselected frequency $f_P$ of, for example, 140 MHz in the predetermined frequency band. Responsive to the predetermined frequency signal and the first through the (N+1)-th gain control signals $C_1$ to $C_{N+1}$, a reciprocal calculation circuit 22 calculates, with respect to the preselected frequency, a reciprocal $\beta$ given by:

$$\beta = 1 / \left| \sum_{x=1}^{N+1} C_x e^{-ix(2\pi f_P)T_0} \right| = 1 / \left| \sum_{y=-M}^{M} C_y e^{-iy(2\pi f_P)T_0} \right| \quad (3)$$

Herein, the denominator of the righthand side of Equation (3) is equal to an absolute value of a sum of those complex tap gains, of which the first through the (N+1)-th gain control signals are representative at the preselected frequency $f_P$. Accordingly, the reciprocal $\beta$ is representative of that reciprocal of the absolute value $|T(2\pi f_P)|$ of Equation (1) or (2) which is calculated in relation to the preselected frequency $f_P$. Namely, the reciprocal $\beta$ is given by:

$$\beta = 1/|T(2\pi f_P)|.$$

The reciprocal calculation circuit 22 produces a reciprocal signal RP representative of the reciprocal $\beta$.

Supplied with the first through the (N+1)-th product signals $P_1$ to $P_{N+1}$, the adder circuit 18 produces a sum signal depicted at SS. The sum signal SS is sent to a multiplication circuit 23 together with the reciprocal signal RP. The multiplication circuit 23 has a gain k given by:

$$k = \alpha\beta,$$

where $\alpha$ is representative of a prescribed constant. Inasmuch as a relationship between the input signal IN and the sum signal SS is represented by $T(2\pi f_P)$ at the preselected frequency $f_P$, the multiplication circuit 23 carries out calculation given by:

$$T(2\pi f_P) \cdot k = T(2\pi f_P) \cdot \alpha\beta = \alpha \qquad (4)$$

This means that the gain between the input and the output signals IN and OUT becomes equal to the constant $\alpha$ at the preselected frequency $f_P$, regardless of variations of the gain control signals $C_1$ to $C_{N+1}$. In other words, the gain of the equalizer is kept constant at the preselected frequency $f_P$, independently of variations of the complex tap gains.

In any event, the multiplication circuit 23 multiplies the sum signal SS by the reciprocal signal RP and serves to produce the output signal OUT. Thus, a combination of the reciprocal calculation circuit 22 and the multiplication circuit 23 is operable to produce the output signal OUT in cooperation with the first multiplying circuit $16_1$ to $16_{N+1}$ and the adder circuit 18 and may be considered as a part of an output signal producing circuit. Moreover, the multiplication circuit 23 is operated in cooperation with the first multiplying circuit $16_1$ to $16_{N+1}$ and the adder circuit 18 in order to combine the input signal IN and the first through the N-th delayed signals $D_1$ to $D_N$ with the reciprocal signal RP and the first through the (N+1)-th gain control signals, respectively. Therefore, the multiplication circuit 23 forms a combining circuit together with the first multiplying circuit and the adder circuit 18.

Figure 3:
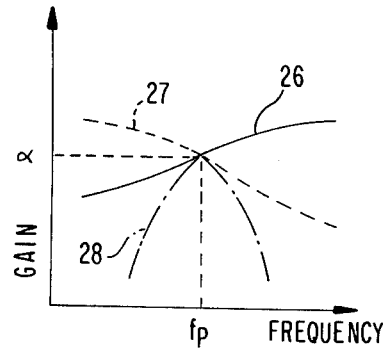
FIG. 3 shows a graphical representation for describing characteristics of the equalizer illustrated in FIG. 2.

Referring to FIG. 3, frequency versus gain characteristics of the equalizer illustrated in FIG. 2 are exemplified by solid, broken, and dot-and-dash curves 26, 27, and 28, respectively. Such characteristics readily can be accomplished by changing a combination of the gain control signals $C_1$ through $C_{N+1}$. All of the characteristics give the constant gain of $\alpha$ at the preselected frequency $f_P$, as shown by the curves 26, 27, and 28.

When the equalizer illustrated in FIG. 2 is used on the transmitting side to equalize the nonlinear characteristic of the transmission line between the transmitting side and the satellite, the signal to noise ratio is kept substantially constant at the preselected frequency $f_P$ on the receiving side and the nonlinear amplifier is put into operation at a substantial constant active point on board the satellite. Accordingly, it is possible to make a reproduction on the receiving side depend only on distortion and noise accompanied by the transmission line. This means that an optimum reproduction is possible on the receiving side when the distortion and the noise are minimized in the transmission line. Thus, equalization becomes extremely simple.

Figure 4:
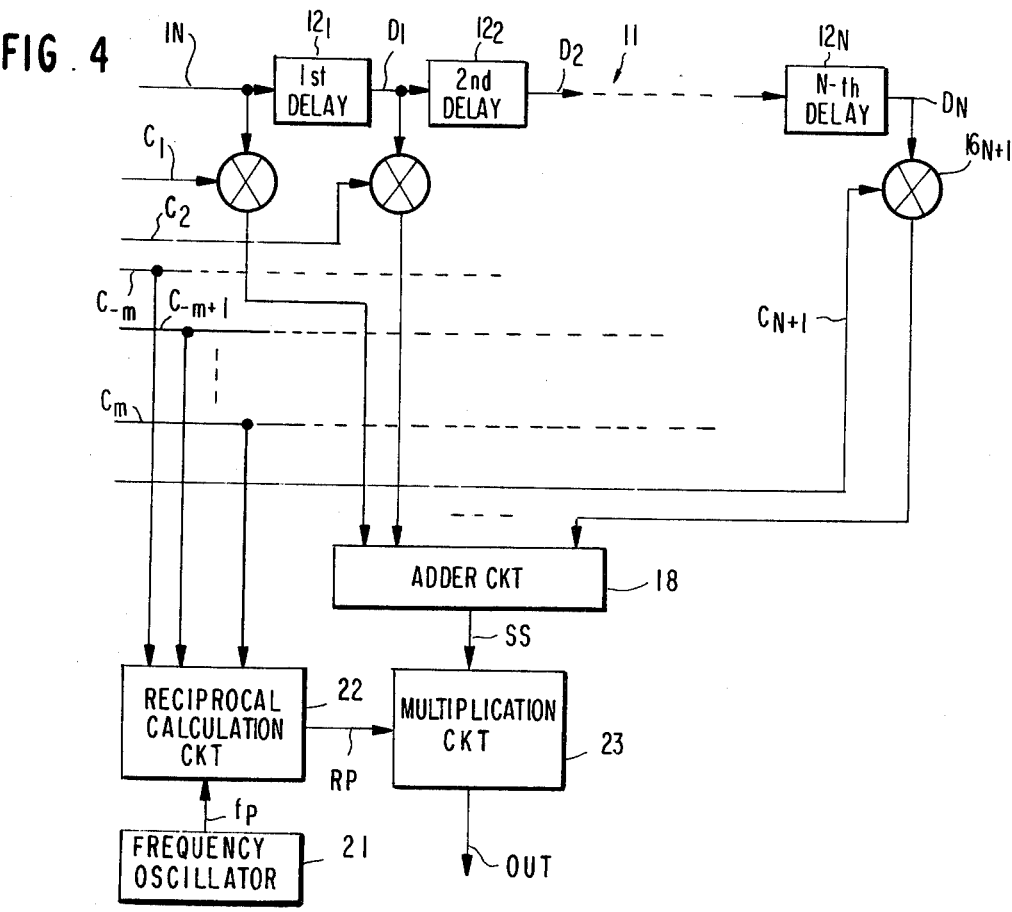
FIG. 4 is a block diagram of an equalizer according to a second embodiment of this invention.

Referring to FIG. 4, an equalizer according to a second embodiment of this invention is similar to that illustrated with reference to FIG. 2 except that selected ones of the first through the (N+1)-th gain control signals $C_1$ to $C_{N+1}$ are used to calculate the reciprocal $\beta$ and to produce the reciprocal signal RP. The selected gain control signals are selected from successive ones of the first through (N+1)-th gain control signals that include an n'-th one of the first through the (N+1)-th gain control signals where n' represents an integer which is nearest to (N+1)/2, namely, M. In other words, the selected gain control signals include the gain control signal allotted to the center tap as described with reference to FIG. 1. This is because the complex tap gains gradually become small with an increase of an absolute value of y of Equation (2) and approximation of the reciprocal $\beta$ is possible by selecting a predetermined integer m less than M described in conjunction with Equation (2). When the number of the tap gain control signals is equal to 2M+1 and such an approximate value of the reciprocal $\beta$ is represented by $\beta'$, the approximate value $\beta'$ is given by:

$$(\beta')^{-1} = T(2\pi f_P) \approx \left| \sum_{y=-m}^{m} C_y e^{-iy(2\pi f_P)T_0} \right|.$$

With the illustrated equalizer, a small number of the gain control signals is supplied to the calculation circuit 22 as compared with the equalizer illustrated in FIG. 2. Therefore, the calculation circuit 22 becomes simple in structure.

Figure 5:
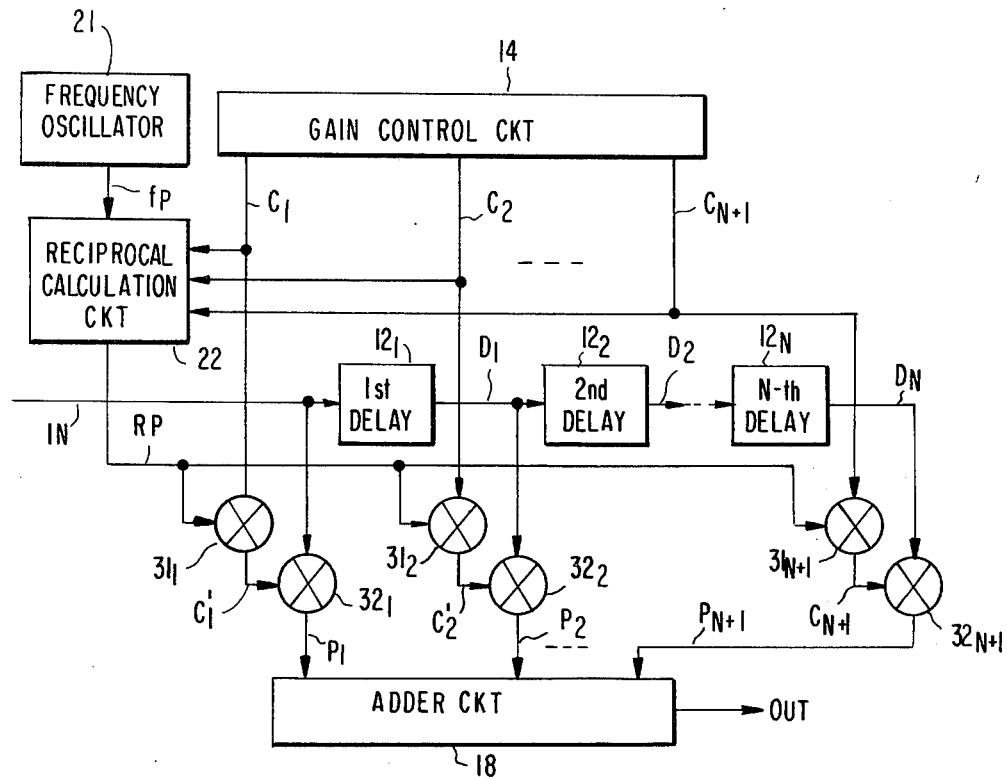
FIG. 5 is a block diagram of an equalizer according to a third embodiment of this invention.

Referring to FIG. 5, an equalizer according to a third embodiment of this invention comprises similar parts designated by like reference numerals. In FIG. 5, the first through the (N+1)-th gain control signals $C_1$ to $C_{N+1}$ are delivered from the gain control circuit 14 to a plurality of multipliers $31_1$, $31_2$, ..., and $31_{N+1}$, equal in number to (N+1), respectively. Responsive to the first through the (N+1)-th gain control signals $C_1$ to $C_{N+1}$, the calculation circuit 22 calculates the reciprocal $\beta$ in a manner described in conjunction with FIG. 2 to produce the reciprocal signal RP. The reciprocal signal RP is commonly given to the multipliers $31_1$ through $31_{N+1}$. The multipliers $31_1$ to $31_{N+1}$ multiply the first through the (N+1)-th gain control signals $C_1$ to $C_{N+1}$ by the reciprocal signal RP to produce first through (N+1)-th preliminary product signals $C'_1$, $C'_2$, ..., and $C'_{N+1}$. The preliminary product signals $C'_1$ to $C'_{N+1}$ are produced prior to production of the product signals $P_1$ through $P_{N+1}$ described in conjunction with FIG. 2. In this sense, a combination of the multipliers $31_1$ through $31_{N+1}$ may be called a first multiplying circuit in the illustrated equalizer. As a result, each of the preliminary product signals $C'_x$ is given by:

$$C'_x = C_x\beta, \qquad (5)$$

where x represents an integer between 1 and N+1, both inclusive.

The first through the (N+1)-th preliminary product signals are multiplied by the input signal IN and the first through the N-th delayed signals $D_1$ to $D_N$ in first through (N+1)-th additional multipliers $32_1$, $32_2$, ..., and $32_{N+1}$, respectively. Eventually, the additional multipliers $32_1$ through $32_{N+1}$ produce first through (N+1)-th ultimate product signals corresponding to the first through the (N+1)-th product signals $P_1$ to $P_{N+1}$ described in connection with FIG. 2, respectively. Use is, therefore, made of similar reference symbols to specify the ultimate product signals in this figure. An aggregation of the additional multipliers $32_1$ through $32_{N+1}$ may be called a second multiplying circuit.

The first through the (N+1)-th ultimate product signals $P_1$ to $P_{N+1}$ are summed up in the adder circuit 18 to be produced as the output signal OUT.

Let an absolute value of a transfer function $T'(2\pi f_P)$ be calculated with respect to the preselected frequency $f_P$ to clarify the relationship between the input and the output signals IN and OUT in the equalizer illustrated in FIG. 5. The absolute value of the transfer function $T'(2\pi f_P)$ is representative of the gain of the illustrated equalizer and may, therefore, be simply referred to as the gain. The gain is defined by:

$$|T(2\pi f_P)| = \left| \sum_{x=1}^{N+1} C_x e^{-ix(2\pi f_P)T_0} \right|. \quad (6)$$

Substitution of Equation (5) into Equation (6) gives:

$$|T(2\pi f_P)| = \left| \sum_{x=1}^{N+1} C_x \beta\, e^{-ix(2\pi f_P)T_0} \right|. \quad (7)$$

Since $\beta$ is a positive number, Equation (7) is rewritten into:

$$|T(2\pi f_P)| = \beta \left| \sum_{x=1}^{N+1} C_x e^{-ix(2\pi f_P)T_0} \right|. \quad (8)$$

When Equation (3) is substituted for $\beta$, Equation (8) is further rewritten into:

$$|T(2\pi f_P)| = \left( 1 / \left| \sum_{x=1}^{N+1} C_x e^{-ix(2\pi f_P)T_0} \right| \right) \left| \sum_{x=1}^{N+1} C_x e^{-ix(2\pi f_P)T_0} \right| \quad (9)$$
$$= 1$$

From Equation (9), it is readily understood that the gain of the illustrated equalizer is equal to unity at the preselected frequency $f_P$. Similar operation is therefore carried out in this equalizer also, as are the cases with the equalizers illustrated with reference to FIGS. 2 and 4. The calculation circuit 22 may be supplied with selected ones of the first through the (N+1)-th gain control signals $C_1$ to $C_{N+1}$, as described with reference to FIG. 4.

At any rate, a combination of the first and the second multiplying circuits and the adder circuit 18 serves to combine the input signal IN and the first through the N-th delayed signals $D_1$ to $D_N$ with the reciprocal signal RP and with the first through the (N+1)-th gain control signals, respectively, to produce the output signal OUT. The combination may be called a combining circuit, like the combining circuit described in conjunction with FIG. 2.

Figure 6:
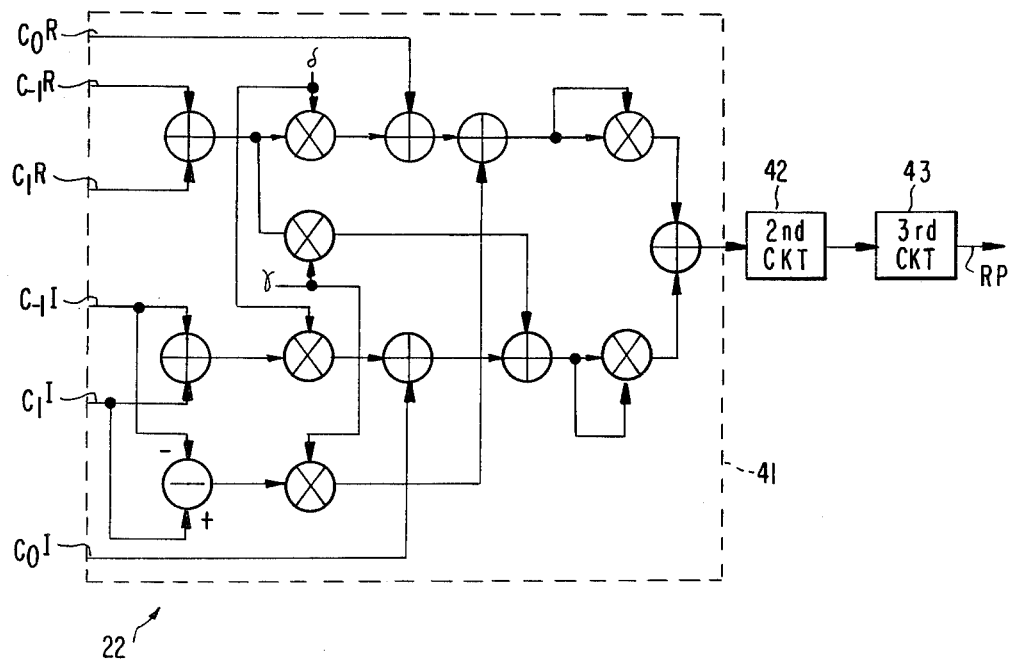
FIG. 6 shows a block diagram of a reciprocal calculation circuit used in each of FIGS. 2, 4, and 5.

Referring to FIG. 6, the reciprocal calculation circuit 22 is specifically illustrated which is applicable to the equalizer according to the first through the third embodiments of this invention. In FIG. 6, the reciprocal $\beta$ is calculated with respect to the preselected frequency by the use of three of successive gain control signals including a gain control signal supplied from the center tap and designated at $C_0$. The remaining gain control signals are, therefore, represented by $C_{-1}$ to $C_1$. Herein, let each of the gain control signals be produced in the form of a complex signal having a real and an imaginary component represented by R and I, respectively. The gain resulting from the three gain control signals is given at the preselected frequency by:

$$|T(2\pi f_P)| = |(C_{-1}^R + iC_{-1}^I)e^{i(2\pi f_P)T_0} + (C_0^R + iC_0^I) + \quad (10)$$
$$(C_1^R + iC_1^I)e^{-i(2\pi f_P)T_0}|.$$

The factors $e^{i(2\pi f_P)T_0}$ and $e^{-i(2\pi f_P)T_0}$ are expressed by:

$$\left.\begin{array}{l} e^{i(2\pi f_P)T_0} = \delta + i\gamma \\ \text{and} \\ e^{-i(2\pi f_P)T_0} = \delta - i\gamma, \end{array}\right\} \quad (11)$$

where $\delta$ and $\gamma$ represent $\cos(2\pi f_P)T_0$ and $\sin(2\pi f_P)T_0$, respectively. Substitution of the formulae (11) into the formula (10) gives:

$$|T(2\pi f_P)| = |C_0^R + \delta(C_{-1}^R + C_1^R) + \gamma(C_1^I - C_{-1}^I) + \quad (13)$$
$$i(C_0^I + \delta(C_{-1}^I + C_1^I) + \gamma(C_{-1}^R + C_1^R))|.$$

The illustrated reciprocal calculation circuit 22 carries out calculation of the formula (13) in a first circuit 41 which comprises seven adders depicted at encircled plus signs, six multipliers depicted at encircled multiplication signs, and a single subtractor depicted at an encircled minus sign. The first circuit 41 further comprises a generator (not shown) for generating a cosine and a sine wave represented by $\delta$ and $\gamma$, respectively. Such a generator can readily be constituted by a combination of s sinusoidal wave oscillator with a phase shifter of $\pi/2$. The first circuit sends a gain signal representative of the gain to a second circuit 42. The second circuit 42 calculates a square root of the gain in response to the gain signal. Coupled to the second circuit 42, a third circuit 43 calculates the reciprocal $\beta$ of the square root of the gain to produce the reciprocal signal RP representative of the reciprocal $\beta$.

While this invention has thus far been described in conjunction with a few embodiments thereof, it will readily been possible for those skilled in the art to put this invention into practice in various manners. For example, the number N may not be an even number but an odd number. Each delay of the delay elements $12_1$ through $12_N$ may not be equal to the others. In addition, the gain control circuit 14 may adaptively change the gain control signals. The equalizer can be placed on the receiving side, although the description is made of the equalizer placed on the transmitting side.

What is claimed is:

1. In an equalizer responsive to an input signal having a predetermined frequency band for supplying an output signal to a transmission line with said output signal adjusted to said transmission line, said equalizer comprising delay means for successively delaying said input signal to produce first through N-th delayed signals, control signal generating means for generating first through (N+1)-th gain control signals which define first through (N+1)-th complex tap gains, respectively, and output signal producing means responsive to said input signal, said first through said N-th delayed signals, and said first through said (N+1)-th gain control signals for producing said output signal, the improvement wherein said output signal producing means comprises:

reciprocal signal producing means responsive to preselected ones of said first through said (N+1)-th gain control signals and a frequency specifying signal specifying a preselected frequency in said predetermined frequency band for producing a reciprocal signal representative of a reciprocal of an absolute value of a sum of those complex tap gains, of which said preselected gain control signals are representative at said preselected frequency; and combining means for combining said input signal and said first through said N-th delayed signals with said reciprocal signal and with said first through said (N+1)-th gain control signals, respectively, to produce said output signal.

2. An equalizer as claimed in claim 1, wherein said combining means comprises:

first multiplying means for multiplying said input signal and said first through said N-th delayed signals by said first through said (N+1)-th gain control signals, respectively, to produce first through (N+1)-th product signals;

adding means for adding said first through said (N+1)-th product signals into a sum signal; and second multiplying means for multiplying said sum signal by said reciprocal signal to produce said output signal.

3. An equalizer as claimed in claim 1, wherein said combining means comprises:

first multiplying means for multiplying said first through said (N+1)-th gain control signals respectively by said reciprocal signal to produce first through (N+1)-th preliminary product signals, respectively;

second multiplying means for multiplying said first through said (N+1)-th preliminary signals respectively by said input signal and said first through said N-th delayed signals to produce first through (N+1)-th ultimate product signals, respectively; and adding means for summing up said first through said (N+1)-th ultimate product signals into said output signal.

4. An equalizer as claimed in any one of claims 1 through 3, wherein all said first through said (N+1)-th gain control signals are used as the respective preselected gain control signals.

5. An equalizer as claimed in any one of claims 1 through 3, wherein said preselected gain control signals are those successive ones of said first through said (N+1)-th gain control signals which include an n'-th one of said first through said (N+1)-th gain control signals, where n' represents an integer which is nearest to (N+1)/2.

* * * * *